(12) United States Patent
Phelps et al.

(10) Patent No.: US 6,920,584 B2
(45) Date of Patent: Jul. 19, 2005

(54) SYSTEM DESIGN VERIFICATION USING SELECTED STATES OF A PROCESSOR-BASED SYSTEM TO REVEAL DEFICIENCIES

(75) Inventors: Andrew E. Phelps, Encinitas, CA (US); Steven F. Weiss, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 623 days.

(21) Appl. No.: 10/007,625

(22) Filed: Nov. 2, 2001

(65) Prior Publication Data

US 2003/0088808 A1 May 8, 2003

(51) Int. Cl.$^7$ ............................................. G06F 11/00
(52) U.S. Cl. ......................................... 714/32; 714/37
(58) Field of Search ............................. 714/32, 33, 37; 709/224; 718/105

(56) References Cited

U.S. PATENT DOCUMENTS

| | | | | |
|---|---|---|---|---|
| 5,548,587 A | * | 8/1996 | Bailey et al. | 370/395.7 |
| 5,878,224 A | * | 3/1999 | Smith | 709/224 |
| 5,926,622 A | * | 7/1999 | Hardin et al. | 714/33 |
| 6,285,974 B1 | | 9/2001 | Mandyam et al. | |
| 6,505,249 B1 | * | 1/2003 | Rehkopf | 709/224 |
| 6,546,507 B1 | * | 4/2003 | Coyle et al. | 714/43 |
| 6,611,936 B2 | * | 8/2003 | Jue et al. | 714/741 |
| 6,708,143 B1 | * | 3/2004 | Kurshan | 703/2 |
| 2001/0010066 A1 | * | 7/2001 | Chin et al. | 711/108 |
| 2003/0060995 A1 | * | 3/2003 | Shah | 702/118 |

FOREIGN PATENT DOCUMENTS

JP 62012985 * 1/1987 ............ G11C/7/00

* cited by examiner

Primary Examiner—Scott Baderman
Assistant Examiner—Joshua Lohn
(74) Attorney, Agent, or Firm—Meyertons Hood Kivlin Kowert & Goetzel, P.C.; B. N Kivlin

(57) ABSTRACT

The present invention provides a method and apparatus for design verification. The method comprises operating a device in the system in a first state, modifying at least one operational characteristic of the device to operate in a second state, and determining if an error condition occurs in the system in response to modifying the operational characteristic of the device. The apparatus comprises an interface and a verification module adapted to receive a control signal from the interface and to adjust an operating characteristic of the apparatus to exercise a system in a manner that is capable of revealing one or more error conditions in the system in response to receiving the control signal.

9 Claims, 5 Drawing Sheets

SYSTEM DESIGN VERIFICATION USING SELECTED STATES OF A PROCESSOR-BASED SYSTEM TO REVEAL DEFICIENCIES

BACKGROUND OF THE INVENTION

1. Field of the Invention

This invention relates generally to design verification, and, more particularly, to verifying the design of one or more elements in a processor-based system.

2. Description of the Related Art

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

One example of a processor-based system used in a network-centric environment is a mid-range server system. A single mid-range server system may have a plurality of system boards that may, for example, be configured as one or more domains, where a domain, for example, may act as a separate machine by running its own instance of an operating system to perform one or more of the configured tasks.

As the number of resources employed within the mid-range server system increases, the challenge of ensuring that the system is designed properly may become increasingly difficult as well. In certain instances, even after thoroughly testing the system under normal or routine operating conditions, some design flaws may nevertheless go undetected. Such undetected design flaws may prove to be costly for businesses, particularly if discovered after the shipping stage or late in development stages.

While references are made herein with respect to a mid-range server system, it should, however, be appreciated that the above-described difficulty of detecting one or more design flaws may also be applicable to other electronic devices.

SUMMARY OF THE INVENTION

In one aspect of the instant invention, an apparatus is provided for design verification. The apparatus comprises an interface and a verification module adapted to receive a control signal from the interface and to adjust an operating characteristic of the apparatus to exercise a system in a manner that is capable of revealing one or more error conditions in the system in response to receiving the control signal.

In another aspect of the present invention, a method is provided for design verification. The method comprises operating a device in the system in a first state, modifying at least one operational characteristic of the device to operate in a second state, and determining if an error condition occurs in the system in response to modifying the operational characteristic of the device.

In yet another aspect of the instant invention, an article comprising one or more machine-readable storage media containing instructions is provided for design verification. The one or more instructions, when executed, cause a processor to operate a device in the system in a first state, modify at least one operational characteristic of the device to operate in a second state, and determine if an error condition occurs in the system in response to modifying the operational characteristic of the device.

BRIEF DESCRIPTION OF THE DRAWINGS

The invention may be understood by reference to the following description taken in conjunction with the accompanying drawings, in which like reference numerals identify like elements, and in which.

Figure 1:
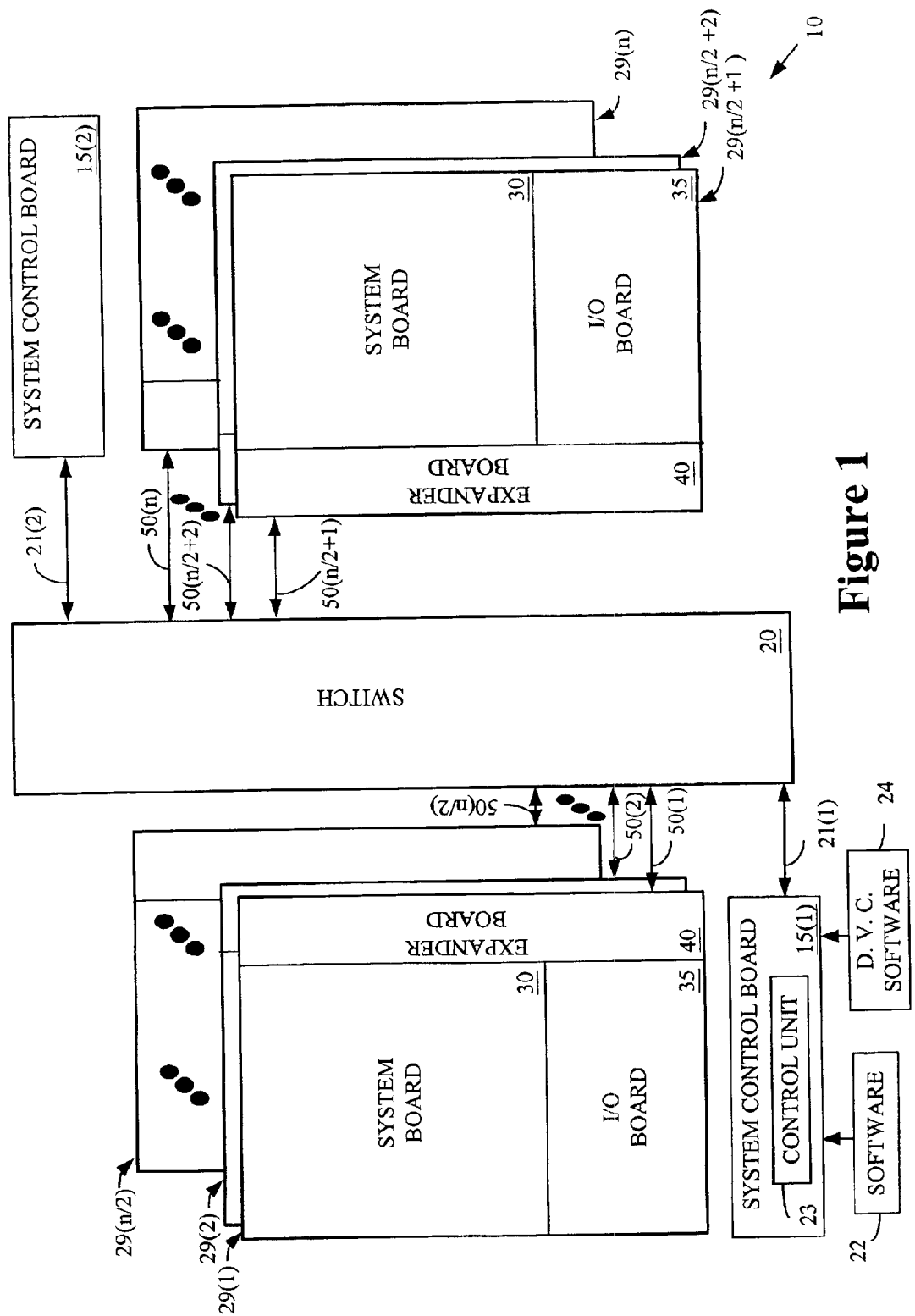
FIG. 1 shows a stylized block diagram of a system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As will be described in more detail below, in accordance with one or more embodiments of the present invention, a method and apparatus are provided for verifying the design of one or more portions of a processor-based system. In one embodiment, the processor-based system may be placed in selected states that may reveal design deficiencies in the processor-based system. As such, it may be possible to reveal design flaws that may have otherwise gone undetected for extended periods of time.

Referring now to FIG. 1, a block diagram of a system 10 in accordance with one embodiment of the present invention is illustrated. The system 10, in one embodiment, includes a plurality of system control boards 15(1–2) that are coupled to a switch 20. For illustrative purposes, lines 21(1–2) are utilized to show that the system control boards 15(1–2) are coupled to the switch 20, although it should be appreciated that, in other embodiments, the boards 15(1–2) may be coupled to the switch in any of a variety of ways, including by edge connectors, cables, or other available interfaces.

In the illustrated embodiment, the system 10 includes two control boards 15(1–2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate hot-swap replaceable system control board. In one embodiment, during any given moment, generally one of the two system control boards 15(1–2) actively controls the overall operations of the system 10.

At least one of the system control boards 15(1–2) may include, in one embodiment, a control unit 23 that may be capable of executing a design verification control routine 24. The design verification control routine 24, in one embodiment, when executed, may exercise one or more elements of the system 10 to verify the functionality of at least a portion of the system 10, as described in more detail below.

The system 10, in one embodiment, includes a plurality of system board sets 29(1–n) that are coupled to the switch 20, as indicated by lines 50(1–n). The system board sets 29(1–n) may be coupled to the switch 20 in one of several ways, including edge connectors or other available interfaces. The switch 20 may serve as a communications conduit for the plurality of system board sets 29(1–n), half of which may be connected on one side of the switch 20 and the other half on the opposite side of the switch 20.

The switch 20, in one embodiment, may be a 18×18 crossbar switch that allows system board sets 29(1–n) and system control boards 15(1–2) to communicate, if desired. Thus, the switch 20 may allow the two system control boards 15(1–2) to communicate with each other or with other system board sets 29(1–n), as well as allow the system board sets 29(1–n) to communicate with each other.

The system board sets 29(1–n), in one embodiment, comprise one or more boards, including a system board 30, I/O board 35, and expander board 40. The system board 30 may include processors and associated memories for executing, in one embodiment, applications, including portions of an operating system. The I/O board 35 may manage I/O cards, such as peripheral component interface cards and optical cards, that are installed in the system 10. The expander board 40, in one embodiment, generally acts as a multiplexer (e.g., 2:1 multiplexer) to allow both the system and I/O boards 30, 35 to interface with the switch 20, which, in some instances, may have only one slot for interfacing with both boards 30, 35.

In one embodiment, the system 10 may be dynamically subdivided into a plurality of system domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system) and may be reconfigured without interrupting the operation of other domains.

Figure 2:
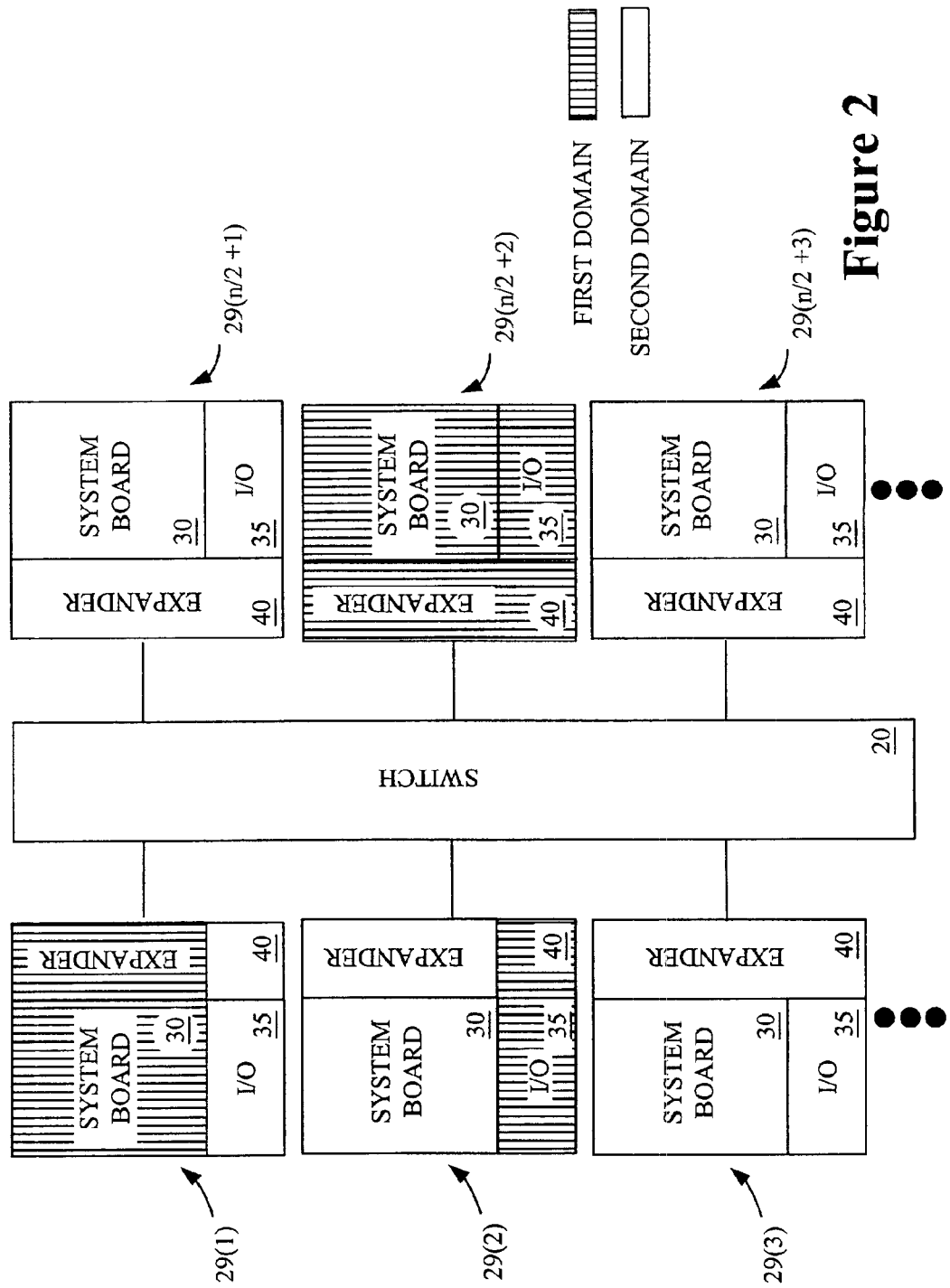
FIG. 2 illustrates a block diagram of an exemplary domain configuration that may be employed in the system of FIG. 1, in accordance with one embodiment of the present invention.

FIG. 2 illustrates an exemplary arrangement where at least two domains are defined in the system 10. The first domain, identified by vertical cross-sectional lines, includes the system board set 29(n/2+2), the system board 30 of the system board set 29(1), and the I/O board 35 of the system board set 29(2). The second domain in the illustrated embodiment includes the system board sets 29(3), 29(n/2+1), and 29(n/2+3), as well as the I/O board 35 of the system board set 29(1) and the system board 30 of the system board set 29(2).

As shown, a domain may be formed of an entire system board set 29(1–n), one or more boards (e.g., system board 30, I/O board 35) from selected system board sets 29(1–n), or a combination thereof. Although not necessary, it may be possible to define each system board set 29(1–n) as a separate domain. For example, if each system board set 29(1–n) were its own domain, the system 10 may conceivably have up to "n" (i.e., the number of system board sets) different domains. When two boards (e.g., system board 30, I/O board 35) from the same system board set 29(1–n) are in different domains, such a configuration is referred to as a "split expander." The expander board 40 of the system board sets 29(1–n), in one embodiment, keeps the transactions separate for each domain. No physical proximity may be needed for boards in a domain.

Using the switch 20, inter-domain communications may be possible. For example, the switch 20 may provide a high-speed communications path so that data may be exchanged between the first domain and the second domain of FIG. 2. In one embodiment, a separate path for data and address through the switch 20 may be used for inter-domain or intra-domain communications.

Figure 3:
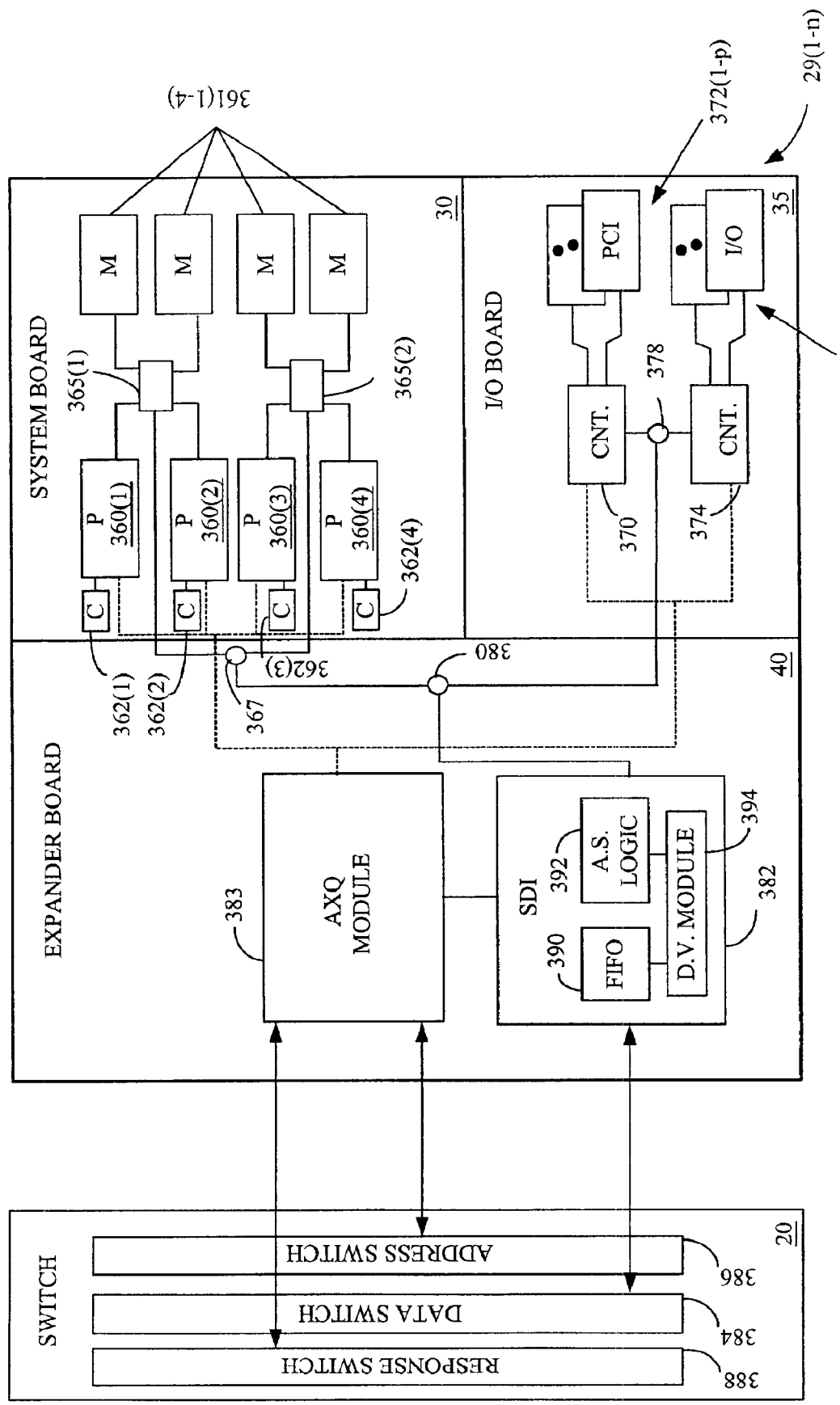
FIG. 3 depicts a stylized block diagram of one system board set that may be employed in the system of FIG. 1, in accordance with one embodiment of the present invention.

Referring now to FIG. 3, a block diagram of the system board set 29(1–n) coupled to the switch 20 is illustrated, in accordance with one embodiment of the present invention. The system board 30 of each system board set 29(1–n) in the illustrated embodiment includes four processors 360(1–4), with each of the processors 360(1–4) having an associated memory 361(1–4). In one embodiment, each of the processors 360(1–4) may be coupled to a respective cache memory 362(1–4). In other embodiments, each of the processors 360(1–4) may have more than one associated cache memories, wherein some or all of the one or more cache memories may reside within the processors 360(1–4). In one embodiment, each cache memory 362(1–4) may be a split cache, where a storage portion of the cache memory 362(1–4) may be external to the processor, and a control portion (e.g., tags and flags) may be resident inside the processors 360(1–4).

The processors 360(1–4), in one embodiment, may be able to access their own respective memories 360(1–4) and 362(1–4), as well as access the memories associated with other processors. In one embodiment, a different number of processors and memories may be employed in any desirable combination, depending on the implementation. In one embodiment, two five-port dual data switches 365(1–2) connect the processor/memory pairs (e.g., processors 360(1–2)/memories 361(1–2) and processors 360(3–4)/memories 361(3–4)) to a board data switch 367.

Although not so limited, the I/O board 35 of each system board set 29(1–n) in the illustrated embodiment includes a controller 370 for managing one or more of the PCI cards that may be installed in one or more PCI slots 372(1–p). In the illustrated embodiment, the I/O board 35 also includes a second controller 374 for managing one or more of I/O cards that may be installed in one or more I/O slots 376(1–o). The I/O slots 376(1–o) may receive optics cards, network cards, and the like. The I/O board 35, in one embodiment, may communicate with the system control board 15(1–2) (see FIG. 1) over an internal network (not shown).

The two controllers 370, 374 of the I/O board 35, in one embodiment, are coupled to a data switch 378. A switch 380 in the expander board 40 receives the output signal from the switch 378 of the I/O board 35 and from the switch 367 of the system board set 29(1–n) and provides it to an System Data Interface (SDI) 382, in one embodiment. The SDI 382 may process data transactions to and from the switch 20 and the system and I/O boards 30 and 35. A separate address path (shown in dashed lines) is shown from the processors 360(1–4) and the controllers 370, 374 to an Address Expander Queue (AXQ) module 383. The AXQ module 383 may process address and response transactions to and from the switch 20 and the system and I/O boards 30 and 35.

In one embodiment, the switch 20 may include a data switch 384, address switch 386, and response switch 388 for transmitting respective data, address, and control signals provided from the expander board 40 of the system board sets 29(1–n). Thus, in one embodiment, the switch 20 may include three 18×18 crossbar switches that provide a separate data path, address path, and control signal path to allow intra- and inter-domain communications. Using separate paths for data, addresses, and control signals, in one embodiment, may reduce the interference among data traffic, address traffic, and control signal traffic. In one embodiment, the switch 20 may provide a bandwidth of about 43 Gigabytes per second. In other embodiments, a higher or lower bandwidth may be achieved using the switch 20.

The SDI 382, in one embodiment, includes a FIFO queue 390 to retain one or more transactions in the order the transactions are received by the SDI 382. The FIFO queue 390 may use an adjustable high-water mark that sets an upper limit on the number of entries the FIFO queue 390 may handle during any particular time. Once the entries in the FIFO queue 390 reach the point indicated by the high-water mark, it may desirable to prevent additional transactions from entering the FIFO queue 390 until the existing entries in the FIFO queue 390 have been cleared to make room for new transactions. The high-water mark may typically be programmed to a preselected level that is less than the maximum number of entries the FIFO queue 390 is actually capable of holding. In this manner, the high-water mark allows the FIFO queue 390 to accommodate (or buffer) any subsequent or lagging transactions as the pending transactions in the FIFO queue 390 complete.

The SDI 382, in one embodiment, includes an anti-starvation logic 392 to prevent one device from continuously driving a bus shared by the SDI 382. In one embodiment, upon detecting that the bus is being driven by another device or expander board 40, the anti-starvation logic 392 may wait a preselected amount of time before taking control of the bus to assert the desired signals. Thus, the anti-starvation logic 392 may be utilized to avoid a starvation condition.

The SDI 382, in one embodiment, includes a design verification module 394 that, upon receiving an indication from the design verification control module 24 of the system control board 15(1), is capable of causing the SDI 382 to operate under selected conditions or states that may reveal deficiencies in the design of one or more portions of the system 10. For example, in one embodiment, the design verification module 394 may adjust the high-water mark of the FIFO 390 in a manner that the FIFO 390 fills rather quickly, thereby changing the operating conditions of the system 10 such that one or more potential design errors in the system 10 may be more readily discovered.

In another embodiment, the design verification module 394 may use the anti-starvation logic 392 to alter the ratio of inbound to outbound transactions between the expander board 40 of the system board set 29(1–n) and the switch 20. That is, the design verification module 394 may, for example, use the anti-starvation logic 392 to gain control of the bus even though the SDI 382 may not be in a starvation condition. As such, the ratio of the inbound to outbound transactions between the expander board 40 and switch 20 may be altered so as to exercise the system 10 in an operational state that may not have otherwise been readily created during normal operations or with everyday use.

It should be noted that the arrangement and/or location of various components (e.g., the AXQ module 383, processors 360(1–4), controllers 370, 374) within each system board set 29(1–n) is a matter of design choice, and thus may vary from one implementation to another. Additionally, more or fewer components may be employed without deviating from the spirit and scope of one or more embodiments of the present invention.

Figure 4:
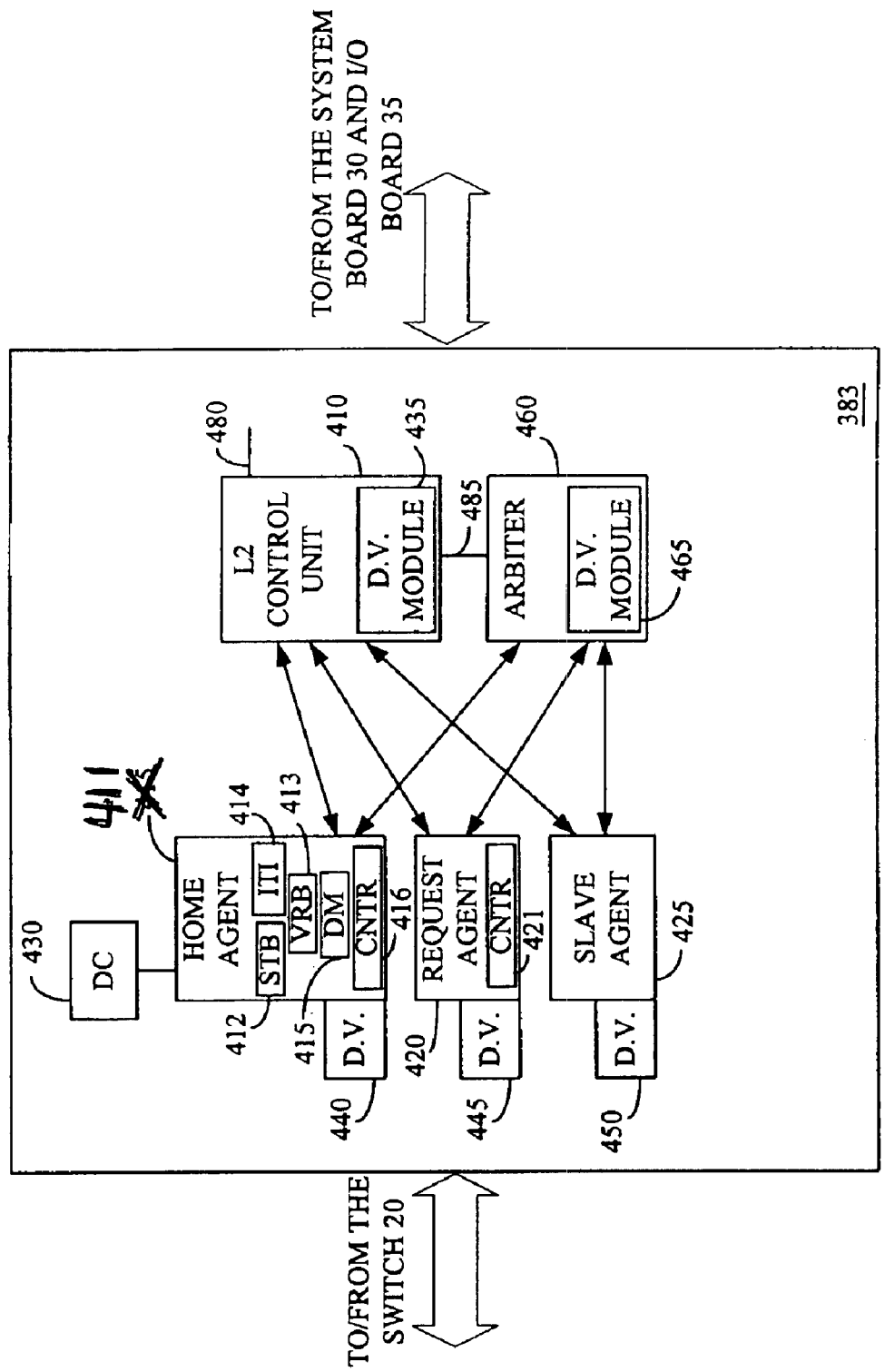
FIG. 4 illustrates a block diagram of one embodiment of an AXQ module that may be employed in the system board set of FIG. 3, in accordance with one embodiment of the present invention.

Referring now to FIG. 4, a block diagram of one embodiment of the AXQ module 383 of FIG. 3 is illustrated. The AXQ module 383, in one embodiment, includes an L2 control unit 410 coupled to a home agent 411, a request agent 420, and a slave agent 425. Collectively, the agents 411, 420, 425 may operate to aid in maintaining system-wide coherency using a directory cache 430. In the illustrated embodiment, the L2 control unit 410 of the AXQ module 383 interconnects the system board 30 and I/O board 35 as well as interconnects the home agent 411, request agent 420, slave agent 425 within the AXQ module 383.

In the illustrated embodiment, the home agent 411 of the AXQ module 383 includes a variety of modules, such as a secondary transfer buffer (STB) 412, a victim rewrite buffer (VRB) 413, an invalidation tag identifiers (ITI) 414, en-direct-map (DM) 415, and one or more counters 416, all of which are described in more detail below. The request agent 420, in the illustrated embodiment, includes one or more counters 421. It should be appreciated that the components of the AXQ module 383 shown in FIG. 4 are exemplary in nature and that in other embodiments fewer or additional components may be employed, depending on the implementation.

In one embodiment, the AXQ module 383, the home agent 411, the request agent 420, and the slave agent 425 have an associated design verification module 435, 440, 445, 450, respectively. In one embodiment, the design verification modules 435, 440, 445, 450 may be integrated within its respective host element (e.g., the L2 control unit 410, the home agent 411, the request agent 420, and the slave agent 425). The design verification modules 435, 440, 445, 450, in one embodiment, may be implemented in software, hardware, or a combination thereof.

The AXQ module 383 of the expander board 40, in one embodiment, includes an arbiter 460 that performs an arbitration function. In one embodiment, if the expander board 40 is split between two domains (i.e., the system and the I/O boards 30 and 35 of one system board set 29(1–n) are in different domains), the arbiter 460 of the AXQ module 383 may arbitrate the system board 30 and I/O board 35 separately, one on odd cycles, and the other on even cycles.

Generally, and as described in more detail below, each of the design verification modules 435, 440, 445, 450, 465 may alter the operating conditions of the system 10 such that one or more potential design errors in the system 10 may be more readily discovered. For example, delays of preselected intervals may be introduced at various points in the system 10, where such delays may not have been likely to occur during normal operations or normal use.

The respective design verification modules 440, 450 of the slave and home agents 411, 425 may adjust, for example, the number of working address transaction identifiers that are available for use. A transaction identifier is typically a unique tag that is associated by the agents 411, 425 to a given transaction to track the transaction while it is active. Generally, the agents 411, 425 have a pool of limited number of transaction identifiers that may be assigned to transactions. Once all of the transaction identifiers have been used from the pool, no more transaction identifiers may be assigned until the pending transactions are complete and the transaction identifiers have been released and made available for selection from the pool once again.

By adjusting, and in particular reducing, the number of transaction identifiers that are assignable by the agents 411, 425, the design verification modules 440, 450 may disrupt the natural flow of transactions. That is, for example, if either one of the design verification modules 440, 450 reduces the number of available transaction identifiers to one, then only one transaction may be processed by the expander board 40 while others wait in a queue until that one transaction is complete. The bottleneck created by such a reduction may stress other portions of the system 10, and in particular boards (e.g., expander 40, I/O board 35, or system board 30), that are waiting for that one transaction to complete.

The design verification module 440 of the home agent 411 may adjust the number of STBs in use. Typically, tags associated with the STB 412 only apply to certain types of address transactions, specifically read-to-share and write-back transactions, where a read-to-share transaction is issued to obtain a shared copy of a cache line and a write-back transaction to write the cached line back to the memory. By adjusting the number of STBs 412 that are available for use, the design verification module 440 is more selective in the manner the transaction flow is restricted, as compared to adjusting the number of available working address transaction identifiers. By selectively restricting the transaction flow, the design verification module 440 of the home agent 411 may exercise the system 10 in a manner (e.g., by disrupting the natural flow of transactions) such that one or more design flaws may be more readily discoverable.

The design verification module 440 of the home agent 411 may adjust the number of VRBs 413 in use. The function of the VRB 413 is generally related to shared entries in the directory cache 430 that are victimized (i.e., entries that need to be written back to home memory). The VRB 413 may thus restrict the number of outstanding entries currently written back to home memory at any given time, thereby exercising the system 10 in a manner that may reveal design flaws in the system 10.

Similarly, the design verification module 440 of the home agent 411 may utilize the ITI 414 to adjust the number of invalidation tags that are available for slave broadcast of shared directory cache victimizations and normal writestream transactions. A writestream transaction may be utilized to write a copy of a cache line. By adjusting the number of available invalidation tags, the design verification module 440 of the home agent 411 may exercise the system 10 in a manner to reveal one or more design flaws that otherwise may not have been so readily discoverable.

The design verification module 440 of the home agent 411 may utilize the DM 415 to reduce the two-way set associative lock structure of the home agent 411 to a one-way lock structure. For example, the lock structure may be reduced from 16 locks to 8 locks. The DM 415 thus may be used to limit the number of outstanding transactions that have obtained "locks," where obtaining a "lock" allows the transaction to complete in the rest of the system 10. In this manner, the design verification module 440 of the home agent 411 is able to place the system 10 in a state where one or more errors may be more readily discovered.

The design verification modules 440, 445 may utilize respective counters 416, 421, which contain various threshold values, to antagonize internal resource contention in the AXQ module 383 by restricting the number of responses/transactions the AXQ module 383 may transmit to other devices in the system 10. In one embodiment, the counters 416, 421 may include more than one counters, where one or more of these counters are programmable. For example, in one embodiment, the home agent 415 may include a response-fifo-counter that limits the number of responses that may be transmitted to the response path, a slave-cahce-fifo-counter that limits the number of slave requests that may be sent to the address path, a hold-noncoherent-counter that prevents the address path of the switch 20 from sending new non-coherent address transactions to the AXQ module 383. The AXQ module 383, in one embodiment, may be required to process a certain number of non-coherent address transactions before it allows the address path to send any additional transactions. The request agent 420, for example, may include a home-cache-fifo-counter that limits the number of home cacheable requests that may be sent to the address path and a home-i/o-fifo-counter that limits the number of I/O requests that may be sent to the address path. One or more of the above referenced counters may be programmed with any desirable threshold value(s) to place the system 10 in a state or condition where design flaws or other errors may be more readily discovered.

The design verification module 445 of the request agent 420 may adjust the number of target identifiers that are available to it. A "target identifier" may be a unique tag associated by a request agent to a given request to deliver store data, and to track the transaction until the data has been delivered by the storing device. This allows the processors 360(1–4)(or other devices) to be designed such that they may not need to keep track of identifiers large enough to be unique throughout the entire system 10. By reducing, for example, the number of available of target identifiers, the request agent 420 is able to process fewer transactions, which may cause a backlog of transactions. As such, with a backlog of transactions, the normal flow of the transactions through various portions of the system 10 may be disrupted, thereby increasing the possibility of revealing one or more errors within the system 10.

The design verification module 465 of the arbiter 460, in one embodiment, may alter the manner in which the arbiter 460 arbitrates the requests received. For example, in one embodiment, the design verification module 465 may cause the arbiter 460 to arbitrate requests received from one or more ports (not shown) at a delayed rate. Alternatively, in one embodiment, the design verification module 465 may cause the arbiter 460 to arbitrate requests received from a particular port at a different rate than those received from other ports. In the latter example, if the arbiter 460 arbitrates the incoming requests from a particular port at a slower rate, then requests coming from that port are likely to be delayed, thereby causing the incoming requests to be queued. The queued requests may in turn affect the timing of other elements in the system 10, thereby exercising the system 10 under conditions that may occur under only unusual and extreme conditions that are difficult to force or create during testing.

The design verification module 435 of the L2 control unit 410 of the expander board 40, in one embodiment, may introduce delays, including random delays, within the system 10. For example, the design verification module 435 of the L2 control unit 410 may introduce random delays by receiving a pause request over an input line 480 and causing the arbiter 460 to pause at selected times by transmitting control signals over a control line 485. Pauses may be asserted by devices (such as processors 360(1–4), I/O cards 376(1–o), or the agents 411, 420, 425 within the AXQ module 383 itself) to indicate their inability to handle further transactions until some resources associated with previous transactions become free. Pause lines in the system 10, in one embodiment, may be a set of lines, such that each pause request is communicated to all the devices (processors 360(1–4), etc.) such that they all pause substantially at the same moment. The delays introduced by the L2 control unit 410 may disrupt the natural flow of incoming and outgoing requests, thereby exercising the system 10 in a manner that may reveal design errors in the system 10.

Figure 5:
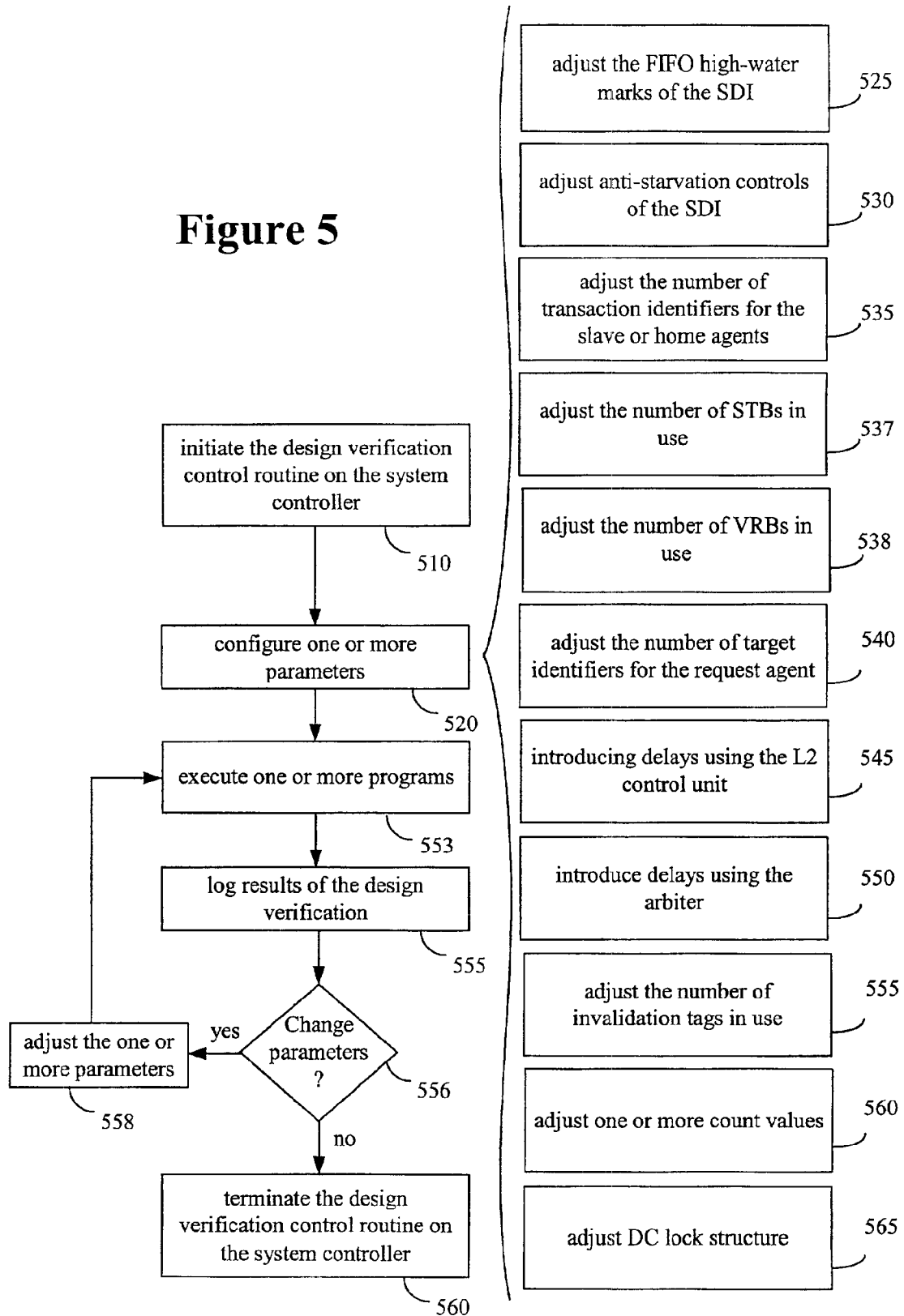
FIG. 5 depicts a flow diagram of a design verification routine that may be employed by the system of FIG. 1, in accordance with one embodiment of the present invention.

Referring now FIG. 5, a flow diagram of the design verification control routine 24 of the system board controller 15(1) is illustrated, in accordance with one embodiment of the present invention. Whenever desirable, a user initiates (at 510) the design verification control routine 24. The design verification control routine 24, upon initiation, in one embodiment, performs (at 520) design verification on selected portions of the system 10. The design verification, in one embodiment, may be performed by causing the system 10 to perform under selected "controlled" circumstances, as described in more detail below.

The design verification control routine 24 allows a user to configure (at 520) one or more parameters in the system 10 to place the system 10 in an unique, unusual, or other desirable state that may not otherwise occur during normal operation. For example, the user may configure (at 520) any combination of one or more of the following parameters at any desirable time: adjust (at 525) the high-water mark in the FIFO 390 (see FIG. 3), adjust (at 530) the anti-starvation controls of the SDI 382, adjust (at 535) the number of transaction identifiers available for allocation to the slave or home agents 411, 425 (see FIG. 4), adjust (at 537) the number of STBs in use, adjust (at 538) the number of VRBs in use, adjust (at 540) the number of target identifiers available to the request agent 420 (see FIG. 4) for allocation, introduce (at 545) delays using the L2 control unit 410 of the AXQ module 383, introduce (at 550) delays by altering the arbitration scheme employed by the arbiter 465, adjust (at 555) the number of invalidation tags in use, adjust (at 560) one or more count values, and/or adjust (at 565) home agent lock structure.

It should be appreciated that configuring (at 520) the one or more parameters may introduce uniform delays and/or non-uniform delays in the system 10. In one embodiment, the system 10, as a whole, may be slowed. In an alternative embodiment, it may be possible to slow down one or more of the arbiter ports or exclude transaction IDs from the AXQ module 383 (see FIG. 3), for example, that would cause transactions to occur at uneven rates, thereby placing the system 10 in an unique or desirable state.

As mentioned, a user may configure any number of a variety of the above-mentioned parameters in the system 10 to allow the system 10 to readily enter states that may have been difficult or rare to achieve during normal operations. Once the parameters in the system 10 are configured (at 520) in the desirable manner, the user may execute (at 553) one or more programs in the system 10. These executable programs, when running on the system 10, may reveal design flaws that may not have otherwise been exposed had the system 10 not been configured (at 520) in the desirable manner. In one embodiment, diagnostic programs (i.e., as opposed to typical programs) may also be executed (at 553) to reveal design flaws in the system 10.

In one embodiment, the design verification control routine 24 logs (at 555) the results upon performing (at 520) the design verification. The results, for example, may be saved in a file that may later be analyzed. In an alternative embodiment, in addition to logging the results, the system 10 may monitor selected buses as the system 10 is being exercised by the design verification control routine 24.

A user may determine (at 556) that it is desirable to change the parameters that were configured (at 520) previously. It may be desirable to change parameters, for example, if the configured state of the system 10 did not reveal any design flaws when one or more programs were executed therein. It may also be desirable to change the parameters, for example, to test the system 10 under different conditions to reveal additional design flaws. Upon determining that it is desirable to change the parameters, the user adjusts (at 558) the parameters that were configured (at 520) previously to place the system 10 in a different state. Once the parameters are adjusted (at 558) by the user, the system 10 may execute (at 553) the one or more programs in this different state of the system 10. In one embodiment, the one or more parameters may be adjusted (at 558) dynamically (i.e., the parameters may be adjusted (at 558) while the one or more programs continue to execute (at 553) on the system 10). The above process may be repeated until the user no longer wishes to change (at 556) the parameters, at which time the design verification control routine 24, in one embodiment, may be terminated (at 560).

The various system layers, routines, or modules may be executable control units (such as control unit 23 (see FIG. 1)). Each control unit may include a microprocessor, a microcontroller, a digital signal processor, a processor card (including one or more microprocessors or controllers), or other control or computing devices. The storage devices referred to in this discussion may include one or more machine-readable storage media for storing data and instructions.

The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for determining one or more error conditions in a system, comprising:

operating a device in the system in a first state;

modifying at least one operational characteristic of the device to operate in a second state by adjusting a number of transaction identifiers that are available to the device during the second state;

determining if an error condition occurs in the system in response to modifying the operational characteristic of the device.

2. A method for determining one or more error conditions in a system, comprising:

operating a device in the system in a first state;

modifying at least one operational characteristic of the device to operate in a second state by adjusting a number of target identifiers that are available to the device during the second state;

determining if an error condition occurs in the system in response to modifying the operational characteristic of the device.

3. A method for determining one or more error conditions in a system, comprising:

operating a device in the system in a first state;

modifying at least one operational characteristic of the device to operate in a second state by adjusting at least one of a number of secondary transfer buffer transactions, victim rewrite buffer transactions, and slave broadcast invalidates that are available during a preselected interval;

determining if an error condition occurs in the system in response to modifying the operational characteristic of the device.

4. A system, comprising:

a control unit adapted to provide a control signal;

a first device adapted to generate one or more requests; and a second device adapted to process one or more requests from the first device using a first configuration and adapted to process one or more requests using a second configuration in response to receiving the control signal;

wherein the first configuration of the second device comprises a preselected number of available transaction identifiers and wherein the second configuration comprises less than the preselected number of available transaction identifiers.

5. A system, comprising:

a control unit adapted to provide a control signal;

a first device adapted to generate one or more requests; and a second device adapted to process one or more requests from the first device using a first configuration and adapted to process one or more requests using a second configuration in response to receiving the control signal;

wherein the first configuration of the second device comprises a preselected number of available target identifiers and wherein the second configuration comprises less than the preselected number of available target identifiers.

6. An article comprising one or more machine-readable storage media containing instructions that when executed enable a processor to:

operate a device in the system in a first state;

modify at least one operational characteristic of the device to operate in a second state by adjust adjusting a number of transaction identifiers that are available to the device during the second state; and determine if an error condition occurs in the system in response to modifying the operational characteristic of the device.

7. An article comprising one or more machine-readable storage media containing instructions that when executed enable a processor to:

operate a device in the system in a first state;

modify at least one operational characteristic of the device to operate in a second state by adjusting a number of target identifiers that are available to the device during the second state; and determine if an error condition occurs in the system in response to modifying the operational characteristic of the device.

8. An apparatus, comprising:

an interface; and a verification module adapted to receive a control signal from the interface in a first state and to adjust an operating characteristic of the apparatus to exercise a system in a second state such that the verification module is capable of revealing one or more error conditions in the system in response to receiving the control signal;

wherein the verification module reduces the number of transactions that may be processed by the apparatus for a preselected interval by reducing a number of transaction identifiers that are available to a device during the second state.

9. An apparatus, comprising:

an interface; and a verification module adapted to receive a control signal from the interface in a first state and to adjust an operating characteristic of the apparatus to exercise a system in a second state such that the verification module is capable of revealing one or more error conditions in the system in response to receiving the control signal;

wherein the verification module increases the number of transactions that may be processed by the apparatus for a preselected interval by increasing a number of transaction identifiers that are available to a device during the second state.

* * * * *